Figure 1B:
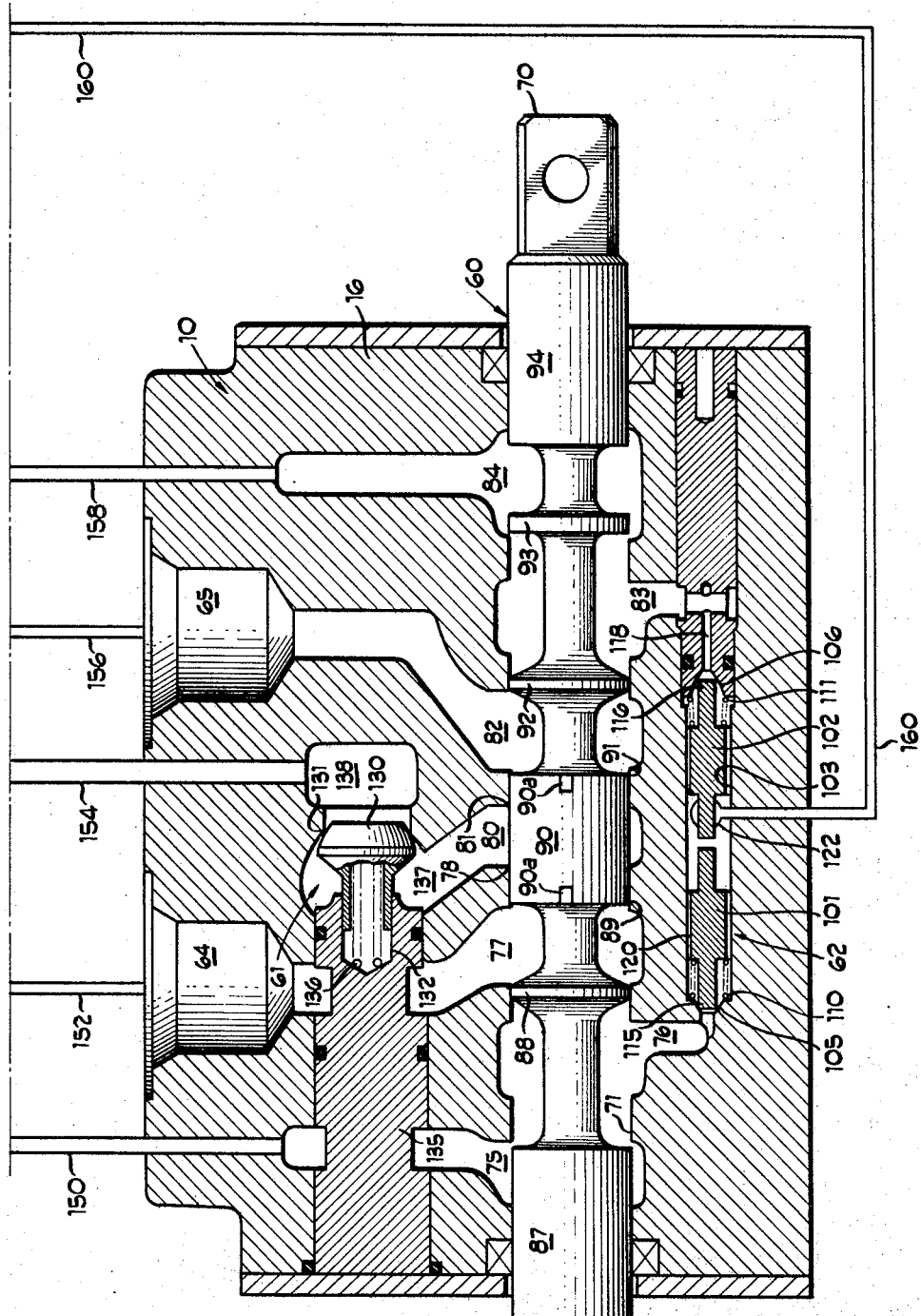

United States Patent

[11] 3,526,247

[72] Inventor Kenneth G. McMillen
 Wolcottville, Indiana
[21] Appl. No. 725,766
[22] Filed May 1, 1968
[45] Patented Sept. 1, 1970
[73] Assignee Borg-Warner Corporation
 Chicago, Illinois
 a corporation of Delaware

[54] VALVE MECHANISM
 18 Claims, 4 Drawing Figs.
[52] U.S. Cl. .................................................. 137/596.13
[51] Int. Cl. .................................................. F16k 11/10
[50] Field of Search ........................................... 137/596,
 596.12, 596.13, 596.2

[56] References Cited
 UNITED STATES PATENTS
3,145,734 8/1964 Lee et al. .................... 137/596.13

3,234,957 2/1966 Allen ............................ 137/596.12X
3,470,694 10/1969 Budzich ........................ 137/613

OTHER REFERENCES
SAE Paper No. 660,607: "Closed Center Systems—1966,"
by Robert E. Kay of Vickers, Inc.

Primary Examiner—Henry T. Klinksiek
Attorney—Donald W. Banner, Lyle S. Motley, C. G.
Stallings and William S. McCurry ABSTRACT: A manual control valve mechanism having a
variable orifice established by movement of the valve, the
variable orifice being connected between a source of fluid
pressure and a fluid actuated device, means controlling the
flow through said orifice so that movement of said valve will
control said fluid actuated device and said means being con-
nected to the fluid supplied to said device and to the output of
said fluid pressure source.

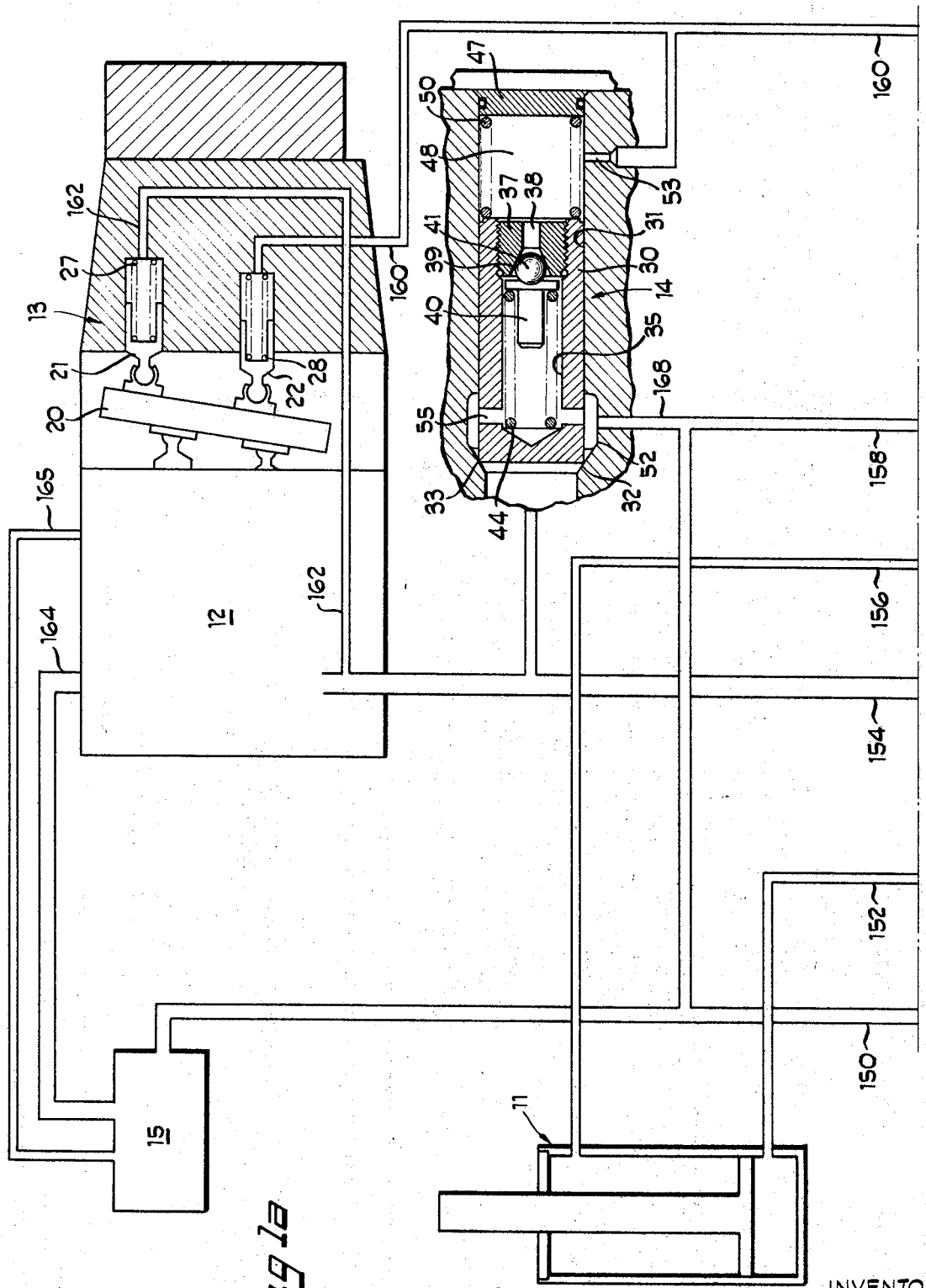

Patented Sept. 1, 1970

3,526,247

Sheet 2 of 4

INVENTOR
KENNETH G. MCMILLEN

BY Robert L. Zieg
ATTORNEY

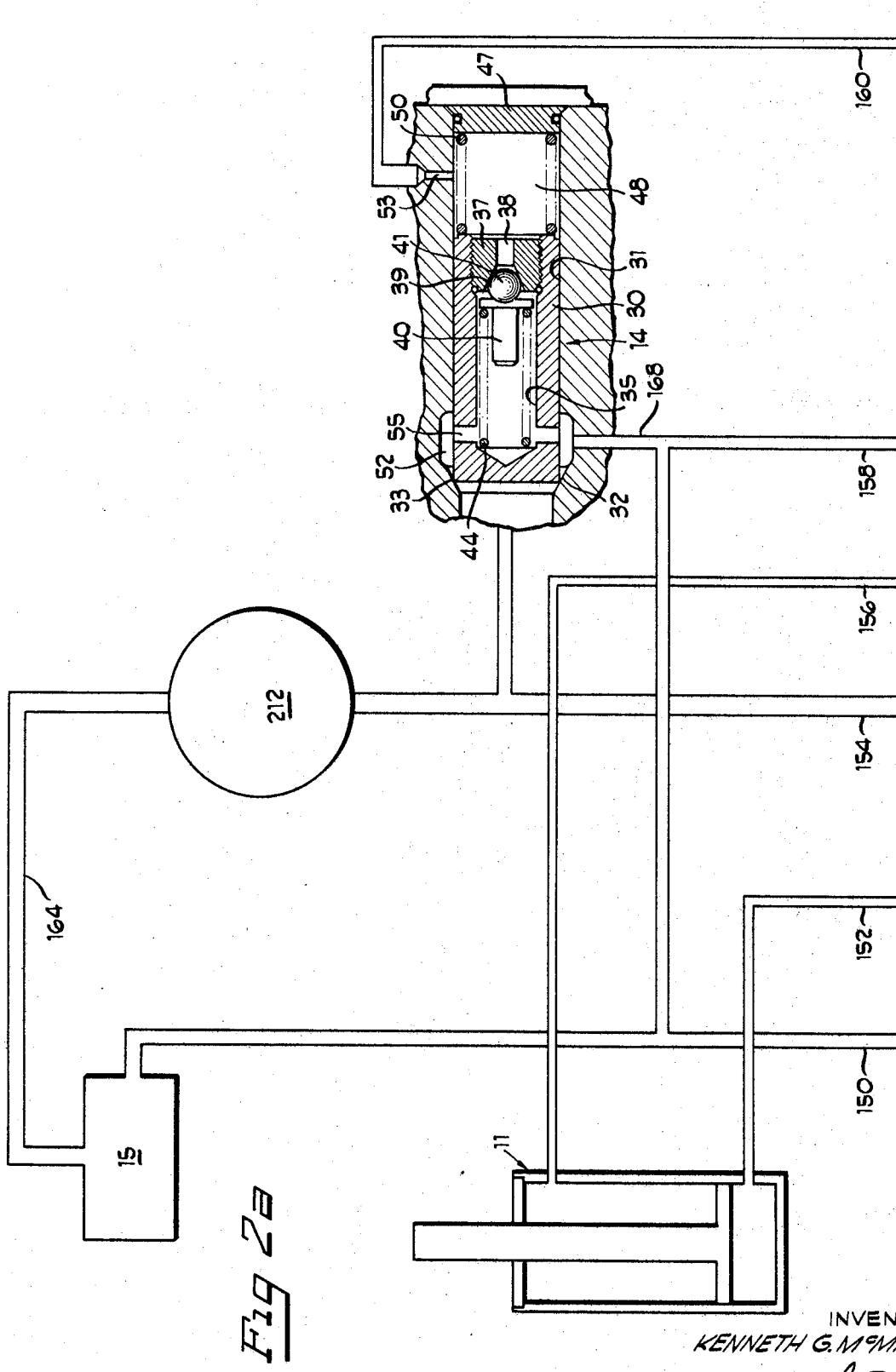

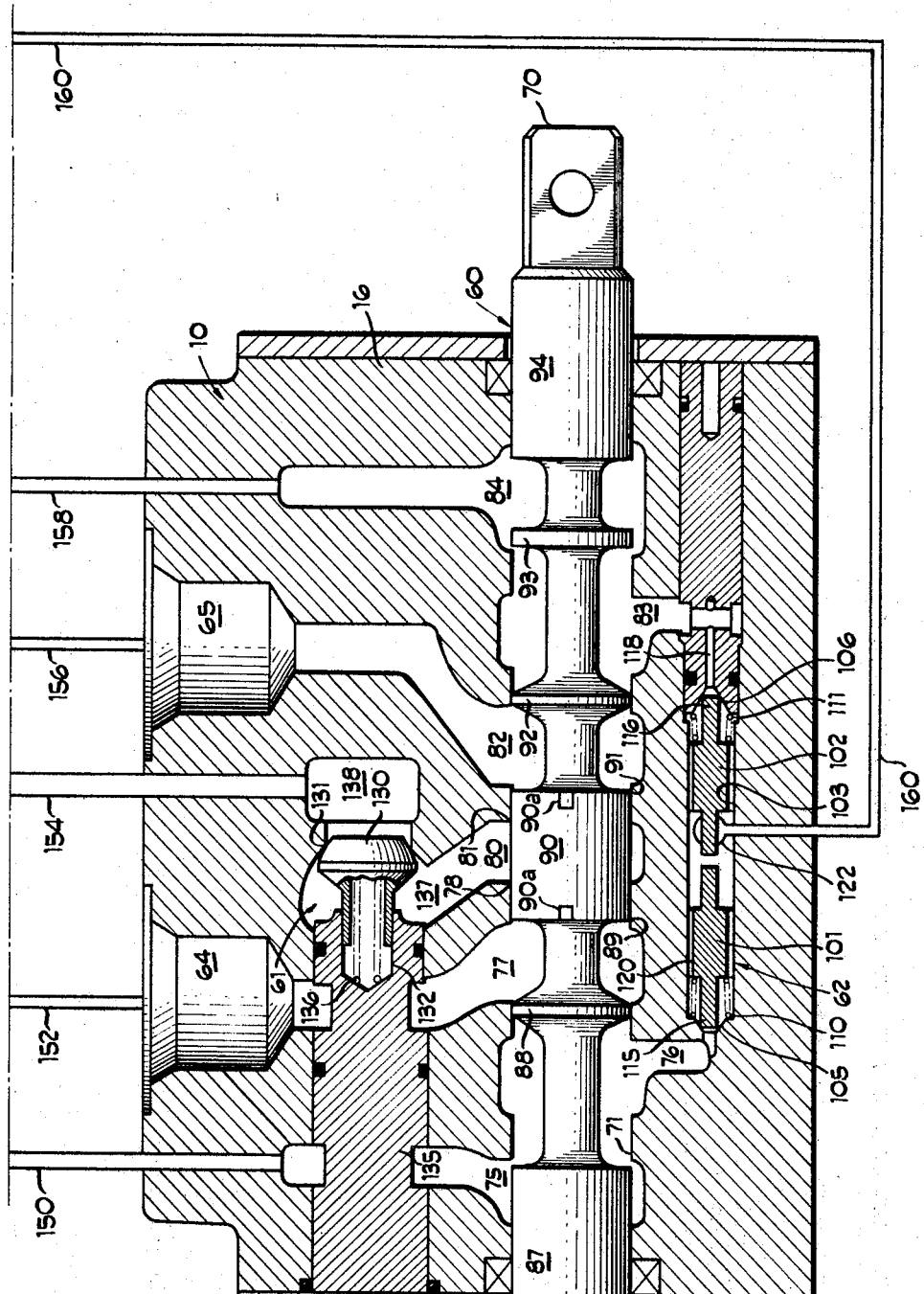

VALVE MECHANISM

In the manual valve control art for load cylinders and other applications, it is difficult to design a system whereby precise movement of the manual valve will effect precise control over the load cylinder being controlled. The present invention comprises a manual control valve mechanism in which, in the case of a variable displacement pump, an orifice size is established which develops a pressure drop between the pump output conduit pressure and the pressure conduit connected to the load, the pressure drop being utilized as a control over the flow through the orifice by varying the displacement of the pump whereby the pump will be kept at the precise displacement to supply the flow called for by the operator and whereby the system automatically compensates for increases in pump rpm which, for example, will take place where the pump is driven by the prime mover of a vehicle.

Further, the present invention comprises the use of a manual valve control wherein an orifice size may be established in the case of a fixed displacement pump where the flow through the orifice is controlled by means of a by-pass valve to maintain a constant pressure drop across the orifice whereby the size of the orifice will vary the flow to the device being controlled so that a precise control of said device is obtained.

Referring to the drawings:

FIGS. 1A and 1B show the control valve of the present invention as utilized with a variable displacement pump for controlling a fluid device; and FIGS. 2A and 2B show the control valve of the present invention as utilized with a fixed displacement pump for controlling a fluid device.

Referring to FIGS. 1A and 1B, an improved valve mechanism 10 is illustrated which is adapted to control a fluid device comprising a work cylinder 11. Other components of the circuit illustrated in FIGS. 1A and 1B are a variable displacement pump or variable discharge pump 12 having a control mechanism 13 for controlling the displacement or the discharge of the pump, and a fluid responsive means comprising a by-pass type relief valve or by-pass valve 14. A reservoir 15, as schematically illustrated, is provided for the circuit. The valve mechanism 10 includes a valve body 16.

Pump 12 has a swash plate 20 which is controlled by the control mechanism or fluid responsive means 13 which includes a piston 21 and a piston 22. A spring 27 urges the piston 21 to the left toward the minimum displacement position of the piston 21 and the swash plate 20. A spring 28 is provided to force piston 22 into contact with swash plate 20.

By-pass valve 14 includes a piston 30 slidable in a bore 31 provided in a section of the valve body 16. A valve seat 32 is provided in bore 31 which is engageable by the edge 33 on the left side of piston 30, as viewed in FIGS. 1A and 1B. The piston 30 includes a central bore 35 which is closed at one end by seat member 37. The seat member 37 has a passage 38 therethrough and includes a valve seat 39. A piston 40 is provided in the bore 35 which engages a ball 41 which is in turn in engagement with seat 39. A spring 44 urges the piston 40 to the right thereby engaging ball 41 with seat 39. The right end of bore 31 is closed by a cap 47 thereby providing a chamber 48. Included in the chamber 48 is a spring 50 which urges the piston 30 to the left into engagement with the seat 32. The bore 31 includes a port 52 and a port 53. Port 53 is in communication with the chamber 48, a radial bore 55 is provided which connects the port 52 with the bore 35 within piston 30.

The improved valve mechanism 10 includes a manual valve 60, a load check valve 61, a check valve section 62. Provided in the valve body 16 are ports 64 and 65 which are alternatively outlet or return ports.

The manual valve 60 comprises a valve spool 70 slidable in bore 71 provided in valve body 16. The bore 71 includes ports 75, 76, 77, 80, 82, 83 and 84 for the valve spool 70. The manual valve spool 70 includes lands 87, 88, 90, 92, 93 and 94.

Port 80 for the valve spool 70 has an edge portion 78 on one side thereof and an edge portion 81 on the other side thereof. The land 90 of the manual valve spool 70 includes an edge portion 89 defined by the land and the grooved portion between lands 88 and 90. Land 90 also has an edge portion 91 which is defined by the land 90 and the groove between lands 90 and 92. Edge portions 91 and 89 of land 90 each includes one or more metering notches 90a. Notches 90a of land 90 and edge portion 89 cooperate with edge portion 78 of bore 71 to define an orifice and notches 90a of land 90 and edge portion 91 of land 90 also with edge portion 81 of bore 71 to define an orifice when the manual valve is moved in either direction from its neutral position as illustrated in FIGS. 1A and 1B and as will be further described in the following description. As will be apparent to those skilled in the art, the metering notches 90a may also be formed in the edge portion of port 80 if desired.

Check valve 62 includes pistons 101 and 102 slidable within a bore 103 in the valve body 16. Also defined in the bore is a valve seat 105 and a valve seat 106. A spring 110 provided in the bore 103 engages piston 101 and a spring 111 is provided in the bore 103 engaging piston 102. The springs 110 and 111 urge the pistons together away from seats 105 and 106. Each of the pistons 101 and 102 has a nose portion 115 and 116 respectively adapted to engage valve seat 105 or 106 to provide a fluid seal. The left end of the bore 103 is connected to port 76 of the manual valve and the right end of bore 103 is connected to port 83 of the manual valve by means of a fluid passage 118. A plurality of slots 120 are provided in the pistons 101 and 102 so that when nose portions 115 or 116 are lifted from their respective valve seats fluid can be conducted through the bore 103 by means of slots 120. Also provided in the bore 103 is a port 122 which is an outlet port from the check valve 62.

Load check valve 61 includes a piston 130 engageable with a seat 131 provided in valve body 16, the piston 130 being slidable in a bore 132 in a fixed body member 135. A spring 136 is provided in the bore 132 urging the piston 130 into engagement with its seat. The load check valve includes a port 137 which is connected to port 80 of the manual valve 60 and also includes a port 138 on the opposite side of piston 130 from port 137.

A conduit 150 connects port 75 of the manual valve 62 with reservoir 15. Port 76 of manual valve 60 is connected to the check valve 62. Port 77 of manual valve 60 is connected to an outlet port 64, and outlet port 64 is connected by means of a conduit 152 to one side of the work cylinder 11. A conduit 154 connects the output of the pump 12 to port 138 of load check valve 61 whereby pressure in conduit 154 may open check valve 61 and be admitted to port 80 of manual valve 60. Port 82 of manual valve 60 is connected to outlet port 65; outlet port 65 is connected by conduit 156 with the opposite side of work cylinder 11 from fluid conduit 152. Port 84 of manual valve 60 is connected by means of a conduit 158 with the reservoir 15. A conduit 160 connects ports 122 of check valve section 62 to piston 22 of swash plate 20 and to port 53 of the relief valve 14. Conduit 154 of pump 12 has a branch conduit 162 which is connected to the piston 21. Pump 12 has an inlet conduit 164 from reservoir 15 and a return conduit 165 connected to reservoir 15. A conduit 168 connects port 52 of relief valve 14 to the reservoir 15. Ports 76 and 83 constitute control ports for valve 60 since they communicate a control pressure signal to conduit 160 to control pump 12 as will be described in the following text.

Operation of the improved control valve of the present invention as used in the closed center circuit illustrated in FIGS. 1A and 1B is as follows:

When control piston 21 is moved to the left as far as possible it will establish the minimum angle position or minimum pump displacement position of swash plate 20. The spring 27 urges the piston 21 to its minimum swash plate angle position. Assuming that it is desired to supply fluid pressure to conduit 152 to actuate the work cylinder 11, valve spool 70 is moved to the right and land 87 of the spool will close ports 75 thereby interrupting communication of the groove between lands 87 and 88 with reservoir 15. Land 88 will be moved into the area of port 77 which, as described in this situation, is the load pressure port or outlet port thereby opening communication between control port 76 and outlet port 77 by way of grooved portion between lands 88 and 90. As movement of the manual valve to the right is continued, an orifice will be established defined by edge 78 of port 80 and notches 90a in edge 89 of valve spool 70. By means of this orifice, port 80 and port 77 of manual valve 60 will be interconnected. Fluid pressure supplied by the pump 12 in conduit 154 opens the load check valve 61 and is admitted to port 80 of the manual valve. In this manner the work cylinder 11 is connected to the output of fluid pump 12 to thereby be actuated to perform a work function.

The load pressure in control port 76 may be referred to as a control pressure or control signal pressure. Pressure in this port will be admitted through check valve section 62 to the conduit 160, the fluid flowing through port 76 acting on piston 101 to move the same to the right thereby moving piston 102 to the right to engage nose portion 116 of piston 102 with valve seat 106. Fluid from port 76 flows through the passage 120 in piston 101 and then through port 122 into conduit 160. Conduit 160 may be referred to as a control pressure conduit since the pressure in conduit 160 will determine the displacement setting of the swash plate 20 for pump 12.

As will be apparent, the operator will establish an orifice size with the valve spool 70 corresponding to the desired flow between the ports 80 and 77 to control work cylinder 11. The flow between ports 80 and 77 across the orifice defined by notches 90a and edge portion 78 will produce a pressure drop. The pressure drop being the difference between the outlet pressure of pump 12 in conduit 154 and the load pressure in conduit 152 and port 77. As described above, the load pressure is communicated to control pressure in conduit 160. Piston 21 has imposed on the end thereof pump pressure from conduit 154 by means of conduit 162. Piston 22 has the control pressure in conduit 160 imposed thereon. Thus the angle of swash plate 20 effected by the difference in pressure or the pressure drop between conduits 154 and 152 as established by movement of the manual valve to determine the size of orifice between ports 77 and 80.

As will be apparent, if the orifice size is increased, the pressure drop decreases. As the pressure drop is decreased the net effect is that the pressure on the piston 21 decreases and approaches the pressure imposed on the piston 22. Thus it will be seen as the pressure in conduit 154 approaches or decreases toward the pressure in conduit 160 the piston 21 will be moved to the right by pressure on piston 22. When piston 21 moves to the right, the swash plate 20 moves toward its maximum angle thereby increasing pump displacement and thereby supplying additional flow as has been called for by the operator in moving manual valve 60 to increase the orifice size between ports 80 and 77 to actuate work cylinder 11.

If the operator wishes decreased flow so as to slow down the actuation of the work cylinder 11, the manual valve, for example, would be moved to the left to decrease the size of the orifice defined by notches 90a of land 90 and edge 78 of port 80. As the orifice size is decreased the flow between ports 80 and 70 will create an increased pressure drop. With an increased pressure drop the differential between the pressure in conduit 160 and conduit 154 is larger. The pressure in conduit 154 impressed on the piston 21 will thus be increased as compared to load pressure imposed on the piston 22. Thus piston 21 will move to the left as viewed in FIGS. 1A and 1B to move swash plate 20 toward the minimum pump displacement position to reduce the flow to be supplied to the work cylinder as is desired by the operator.

From the above it will be apparent that the novel and improved valve mechanism 10 is a manual valve which includes means to establish a control pressure chamber which will have the load pressure at the work zone therein, this pressure being communicated to the control pressure conduit to adjust the pump displacement in accord with requirements of the load.

It will be apparent the manual valve 60 will work in a similar manner to that above if it is desired to supply pressure to the opposite side of the work cylinder 11 through conduit 156. In this instance the manual valve spool 70 would be moved to the left to establish a variable orifice between notches 90a of edge 91 of land 90 and edge 81 of port 80. The pump pressure in conduit 154 thus flowing between ports 80 and 82 through the orifice established. The device works in a similar manner to develop a pressure drop across the orifice which is utilized in conjunction with a control pressure signal in conduit 160. When pressure is being supplied to conduit 156 port 82 has the load pressure therein. When the manual valve spool 70 has been moved to the left into the area of port 82 so that land 92 is in the area of port 82 the control port 83 will have the load pressure therein as communicated by the grooved portion between lands 88 and 90 of spool 70 which will be communicated through port 83, passage 118 and check valve section 62 to the control pressure conduit 160. The piston 102 in this instance is moved off seat 106 and acts to engage piston 101 with its seat 105 to prevent flow from port 83 entering port 76 of the manual valve.

Thus in either direction of operation of the work cylinder 11 the orifice area is established by the operator by adjusting the manual valve in accord with desired flow to the work cylinder and thereby the pump displacement is adjusted to match the load requirements. This is advantageous in that if the pump 12 is, for example, driven by the engine of a vehicle and the rpm thereof varies widely in accordance with the rpm of the engine since the pressure drop across the orifice is utilized as the controlling force for the pump, the pump displacement will be adjusted to supply the flow requirements regardless of the rpm of the pump.

Relief valve 14 is operative to maintain a pressure in the pump conduit 154 so that sufficient pressure will exist in conduit 162 to hold the pump in its minimum angle position when the manual valve is in its neutral position. The control pressure in conduit 160 is imposed on the right side of piston 30 and the pump output pressure is imposed on the left side of the piston 30. The piston 30 will move away from the seat 32 to communicate pump output to the reservoir when the manual valve is in its neutral position if the pressure of conduit 154 exceeds the force of spring 50 since there will be no pressure in chamber 48 or conduit 160 at this time. Relief valve 14 will remain closed for most conditions of operation except when manual valve 60 is in its neutral position.

Further, the relief valve contains a safety relief therein in that if the load pressure in conduit 160 exceeds a predetermined maximum valve the ball 41 will move from its seat 39 allowing load pressure in conduit 160 to flow to bore 35, port 55 and conduit 168 to the reservoir, thus stabilizing the pressure in chamber 48 of relief valve 14 under which condition the relief valve piston 30 will be moved to the right by the pump output pressure and the entire pump flow will be dumped to the reservoir by the piston 30 moving off seat 32.

When valve spool 70 is returned to its neutral position as shown in FIGS. 1A and 1B it is desirable to provide a means to eliminate the pressure signal in conduit 160 so that a lower pressure in conduit 162 can return the swash plate 20 to minimum angle position. The pressure in conduit 160 can flow past either check valve pistons 101 or 102, whichever is open, and through port 76 or 83 respectively to reservoir ports 75 or 84, respectively. Thus, with the valve spool in its neutral position both the displacement and the pressure of the pump are reduced achieving a low pressure and almost zero flow standby condition.

It is readily apparent that the system as described in FIGS. 1A and 1B provides an automatic control for a source of pressure so that the pump outlet pressure is a small and substantially constant increment above the control port pressure and that the pump output flow is adjusted to provide this pressure slightly above the control port pressure. The result is that the pump output varies with the area of the variable orifice in the valve. In like manner, low pressure and almost zero displacement is achieved, when the spool is in its standby or neutral position.

As described above, the manual valve spool 70 has a neutral position in which land 90 blocks the pump pressure in port 80 and no fluid is supplied to work cylinder 11. The manual valve spool 70 has a second position which has been described above providing fluid communication between port 80 and port 77 to conduit 152 to one side of work cylinder 11 and a third position providing communication between port 80 and port 82 and thereby conduit 156 to the opposite side of work cylinder 11. Manual valve spool 70 also has a fourth position which may be termed a "float" position in which the manual valve is moved to the left from the neutral position pictured in FIG. 1B to a position in which lands 90 and 92 together block the port 80 to interrupt communication from the pump. Land 88 moves into an area to the left of port 76 allowing communication between port 77 and port 75 and land 93 is moved into a position to the left of port 83 allowing communication between port 82 and port 84. Thus, in the "float" position of manual valve 60 each side of work cylinder 11 is in communication with the reservoir 15 through ports 84 or 75 so that any implement or device being controlled by work cylinder 11 may move up or down or "float" rather than being locked in a particular position as would be the case if the manual valve spool 70 were returned to its neutral position.

Referring to FIGS. 2A and 2B, the improved valve mechanism of the present invention is illustrated as used with a fixed displacement pump. In the circuit illustrated in FIGS. 2A and 2B, valve mechanism 10 is identical in construction to valve mechanism 10 of FIGS. 1A and 1B and has the same reference numerals applied thereto. Other like parts of the circuit of FIGS. 2A and 2B as compared to FIGS. 1A and 1B have the same numerals. However, in the circuit of FIGS. 2A and 2B a fixed displacement pump 212 is utilized as would be the case in an open center circuit.

Relief valve 14 of FIGS. 2A and 2B is identical in construction to that of relief valve 14 of FIGS. 1A and 1B although as described above with relief valve 14 of FIGS. 1A and 1B, the valve will remain closed most of the time unless the maximum pressure setting is exceeded or unless the valve spool 70 is in the neutral position. In the circuit of FIGS. 2A and 2B, due to the characteristics of a fixed displacement pump such as pump 212, relief valve 14 will be open any time pump output exceeds demand, bypassing excess pump flow to the reservoir. The manual valve 60 of FIGS. 2A and 2B operates in an identical manner to that as described in FIGS. 1A and 1B in that when the operator moves the valve to call for a desired flow to actuate the work cylinder 11 a variable orifice will be defined between notches 90a on one of the edges 89 or 91 of land 90 and one of the edges 78 or 81 of port 80. Pump flow will then be communicated across the orifice to the work cylinder 11. In the embodiment of FIGS. 2A and 2B the control pressure in conduit 160 is admitted to chamber 48 and is imposed on piston 30 of relief valve 14. The spring 50 of the relief valve is selected so as to provide the desired value for a constant pressure drop to be developed across the orifice established in the manual valve. For example, a spring creating 50 psi pressure may be used which would maintain a constant pressure drop of 50 psi between the pump output conduit 154 as felt on the left side of piston 30 of relief valve 14 and the load pressure which will exist in conduit 160 as felt on the right side of piston 30 of relief valve 14. Thereby the pressure drop across the orifice established in the manual valve 60 will be held constant to a value dependent upon the value of spring used in relief valve 14.

When the pump 212 is in operation, since it is a fixed displacement pump, the pump pressure in conduit 154 will act on piston 30 in relief valve 14 to move piston 30 off of the seat 32 to dump the pump flow to the reservoir 15 when the control valve 60 is in the neutral position and no flow is being communicated to the work cylinder. When the manual valve 60 is moved to establish an orifice size to communicate pump flow to the work cylinder the load pressure as described in the case of FIGS. 1A and 1B will be communicated to control pressure conduit 160 and thereby to the right side of piston 30 of relief valve 14. Thereby with the aid of the spring 50 moving piston 30 toward an engaging position with the seat 32. The relief valve will then act to maintain a constant pressure drop across the orifice, i.e., a constant pressure drop between conduits 154 and 160 dumping excess flow through conduit 168 from relief valve 14 and to the reservoir.

The constant pressure drop maintained across the orifice of the manual valve 60 maintains the flow across the orifice from the manual valve consistent with the size of the orifice. As the orifice size is increased the flow will increase and as it is decreased the flow will decrease in a consistent manner. Further, if a constant pressure drop is maintained regardless of the rpm of the pump 212, a given flow will be maintained across the orifice of the manual valve corresponding to a given orifice size within the limits of the pump displacement.

Thus in the construction of FIGS. 2A and 2B the control pressure in control port 76 or control port 83 of the manual valve 60 will provide a signal to the control pressure conduit 160 which is the load pressure. This pressure acts on the relief valve to maintain a constant pressure drop regardless of the rpm of pump 212. Thus, similarly to the operation of the valve as utilized in FIGS. 1A and 1B, the load pressure at the work cylinder is utilized as a control signal to adjust the effective output of the pump so that the flow as desired by the operator will be supplied regardless of the rpm of the pump. In the construction of FIGS. 2A and 2B, as in the case of FIGS. 1A and 1B, means are provided to release pressure from conduit 160 when valve spool 60 is moved to the neutral position. Pressure in conduit 160 will flow past either check valve piston 101 or 102, whichever is open, and through port 76 or 83 respectively to the reservoir when valve spool 60 is returned to the neutral position.

In the above descriptions the improved valve mechanism of the present invention has been shown in an open center circuit and in a closed center circuit and in a situation where the manual valve is controlling a simple work cylinder 11. It will be apparent that the present valve mechanism may be utilized to control any fluid actuated device such as other types of fluid motors or position controllers. Further, in the case of FIGS. 2A and 2B any type of fixed displacement pump may be utilized and controlled to effect the actuation of the fluid device. In the case of the FIGS. 1A and 1B embodiment, it will be apparent that the present invention is readily adaptable to control the displacement of any known variable displacement pump and not only the swash plate type of pump illustrated in FIGS. 1A and 1B. For example, variable displacement vane pumps and variable displacement radial piston pumps may be controlled.

Various features of the invention have been particularly shown and described; however, it should be obvious to one skilled in the art that modifications may be made therein without departing from the scope of the invention.

I claim:

1. A control valve mechanism for a hydraulic system including a valve spool, a first port connected to a source of fluid pressure, a second port adapted to be connected to a fluid actuated device, and an exhaust port, a first land on said valve spool defining a variable size orifice between said first and second ports, a second land on said valve spool, said valve spool being movable to vary the size of said orifice to control operation of said fluid actuated device, means operatively connected to said first and second ports and adapted to control the flow through said orifice by control of said source whereby said fluid device will respond to the size of the orifice as determined by movement of said valve spool, and said spool having a position in which said second land establishes communication between said exhaust port and said second port and said second land establishes communication between said means and said second port when said spool is moved to establish said orifice.

2. A control valve mechanism as claimed in claim 1 wherein said source comprises a variable displacement pump.

3. A control valve mechanism as claimed in claim 2 including a control piston means adapted to vary the displacement of said pump.

4. A control valve mechanism as claimed in claim 1 wherein said means include a bypass valve mechanism operative to establish a constant pressure drop between said ports and across said orifice whereby the flow across said orifice will vary directly with the size of said orifice.

5. A control valve as claimed in claim 4 wherein said valve means includes a piston having the pressure in said first and second ports imposed on opposite sides thereof.

6. A control valve as claimed in claim 4 wherein said source of pressure comprises a fixed displacement pump.

7. A control valve as claimed in claim 1 wherein said second land blocks communication between said second port and said valve means when said valve spool is in the neutral position.

8. A control valve for controlling a fluid actuated device connected to a load and including a valve spool movable to supply fluid to the device, a source of fluid pressure and a fluid reservoir for said source, said control valve having an inlet port connected to said source and first and second outlet ports connected to said fluid actuated device, said control valve having first and second exhaust ports connected to the reservoir for said pressure source, means on said valve spool adapted to establish a variable orifice between said port connected to said pressure source and either of said first or second ports connected to said fluid actuated device, controlling means controlling the supply of pressure to said inlet port in response to the position of said valve spool, said controlling means being in fluid communication with said inlet port, said valve spool having a neutral position blocking said inlet port, said valve spool having a second position establishing said variable size orifice between said inlet port and one of said ports connected to the fluid actuated device and establishing communication between said one port and said controlling means, said valve spool having a third position establishing a variable size orifice between the inlet port and the other of said outlet ports connected to said fluid actuated device and establishing communication between said other outlet port and said controlling means, and said valve spool having a fourth position in which said inlet port is blocked and each of said first and second ports connected to the fluid device are connected to one of said first and second exhaust ports whereby a "float" position is established for said fluid actuated device wherein the load controlled by said fluid actuated device may move relative to said device.

9. A control valve as claimed in claim 8 wherein a land is provided on said valve spool, said land having notches therein adapted to define said variable size orifices.

10. A control valve including a valve spool; a first port adapted to be connected to a source of fluid pressure; a second port adapted to be connected to a fluid actuated device; a third port adapted to be connected to a means for controlling the source; said valve spool including a first land with means thereon defining a variable orifice communication between said first port and said second port; and a second land on said spool operative to establish communication between said second port and said third port when said valve spool is moved to establish said communication between said first port and said second port, and operative to interrupt said communication between said second port and said third port when said valve spool is moved to interrupt said communication between said first port and said second port.

11. A control valve as claimed in claim 10 including a fourth port adapted to be connected to a fluid reservoir; a third land operative to interrupt communication between said third port and said fourth port when said communication between said second port and said third port is established, and operative to establish said communication between said third port and said fourth port when communication between said second port and said third port is interrupted.

12. A control valve, as claimed in claim 11, wherein said spool is movable to a position in which said second land is effective to establish communication between said second port and said fourth port when said first land interrupts communication between said first port and said second port and said third land establishes communication between said third port and said fourth port.

13. In a hydraulic system including a source of pressure, a reservoir, and a fluid actuated device:

a control valve mechanism and a fluid responsive means operatively connected to said system;

said fluid responsive means being adapted to control the fluid supplied to said valve mechanism in response to the fluid pressure as supplied to said means by said control valve;

said control valve comprising a valve body having a bore fitted with a valve spool that is movable from a neutral position to first and second operating positions;

said valve body having a pressure port connected to said source of pressure, an outlet port connected to said fluid actuated device, an exhaust port connected to said reservoir, and a control port connected to said means;

said spool including land and groove portions adapted to establish and to block fluid communication between said ports as said spool is moved from said neutral position to said operating positions;

said spool being effective to control the application of fluid from said source to said device, to control the exhausting of fluid from said device, and to control the application of load pressure from said device to said control port and to said means;

one of said spool lands and adjacent grooves on said spool establishing fluid communication between said pressure port, said outlet port and said control port when said valve spool is in said first operating position; and whereby said control valve mechanism controls said device and said means controls the fluid pressure supplied to said valve mechanism in response to the load pressure of said device.

14. A hydraulic system as claimed in claim 13 wherein said one spool land and said adjacent grooves establish fluid communication between said outlet port, said control port and said exhaust port when said valve spool is in said second operating position.

15. A hydraulic system as claimed in claim 13 in which said source of fluid pressure includes a fixed displacement pump, and said fluid responsive means includes a bypass valve responsive to the fluid pressure of said fixed displacement pump and to the fluid pressure in said control port.

16. A hydraulic system as claimed in claim 13 in which said source of fluid pressure includes a variable displacement pump, and said fluid responsive means includes a displacement control mechanism operatively connected to said pump.

17. A hydraulic system as claimed in claim 13 wherein said valve spool provides fluid communication between said control port and said exhaust port when said valve spool is in said neutral position, and said valve spool blocks fluid communication between said control port and said exhaust port when said valve spool is in said first operating position, whereby the fluid pressure in said control port is reduced when said valve spool is in said neutral position.

18. A hydraulic system as claimed in claim 13 in which said control port is interposed in said valve body between said outlet port and said exhaust port.